United States Patent Office 2,972,339
Patented Feb. 21, 1961

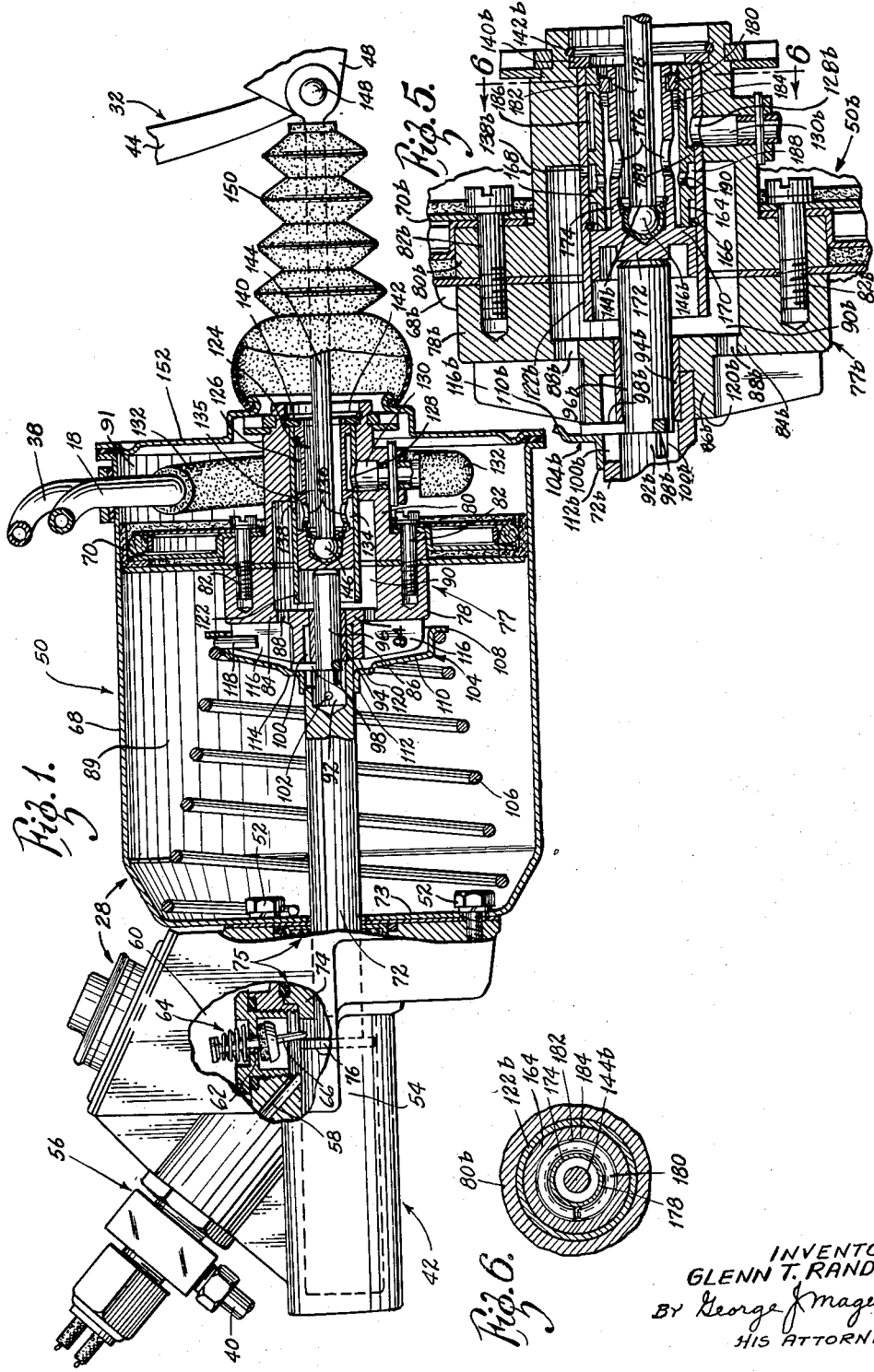

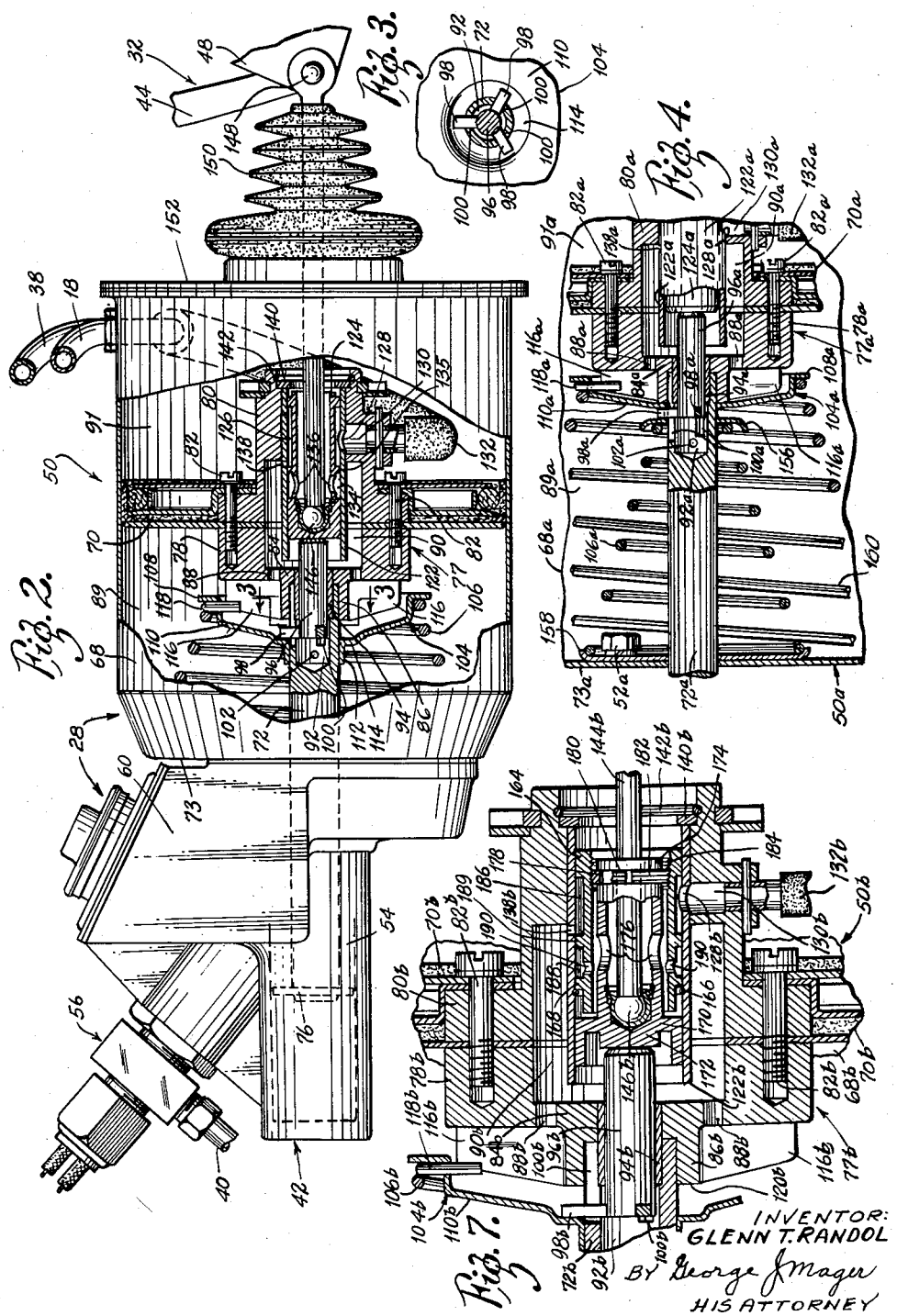

2,972,339

CONTROL VALVE ADAPTED FOR PRESSURE DIFFERENTIAL SERVOMOTOR USE

Glenn T. Randol, Mountain Lake Park, Md., assignor of fifty percent to Hamill-Markus Industries, Inc., Warren, Mich.

Original application July 8, 1953, Ser. No. 366,736, now Patent No. 2,903,855, dated Sept. 15, 1959. Divided and this application Oct. 17, 1957, Ser. No. 690,779

4 Claims. (Cl. 121—46.5)

The present invention relates to novel valve mechanism for controlling pneumatic devices, and more particularly to valve mechanism for controlling pressure differential operated servomotors adaptable for use in the brake or steering system of automotive vehicles and the like. This application is a division of my copending application Serial No. 366,736, filed July 8, 1953, now matured as Patent 2,903,855, dated September 15, 1959.

In my copending application referred to above, I have disclosed a vacuum-operated booster brake mechanism including a fluid pressure actuated servomotor which is controllable by a novel and improved valve mechanism through the medium of an operator-operated member exemplarily illustrated as a suspended-pedal pivotally supported at its upper end on a bracket attached to the firewall of the motor vehicle in the driver's compartment. The control valve mechanism is characterized by certain novel features of construction and operation which relate to the valve mechanism per se, thus rendering such valve mechanism applicable to the control of a wide range of pneumatically-actuated devices including its association with vehicular brake systems. These features of the valve mechanism per set form the subject-matter of the present application.

An object of the present invention is the provision of new and improved control valve mechanism operatively associated with the movable wall of such servomotors to control energization of the same, said valve mechanism including at least two principal cooperating elements relatively displaceable from a normal "off" position wherein pressures are balanced on opposite sides of said wall to inactivate the same, and to an "on" operating position wherein differential pressures are established on opposite sides of said wall to activate said servomotor, and a normally preloaded spring reacting between a fixed member and the pedal operated valve element to produce progressively augmented reactive force on the pedal in accordance with the operating movement of the latter from normal position, and wherein said spring is effective in response to removal of operator force from said pedal, to urge the said wall of its normally released position and the two valve elements to their normal "off" positions.

In one of the disclosed embodiments of my novel control valve means there is provided two principal cooperating elements one of which is slidably interfitted with the other, and which are operatively disposed between a member acted on by said spring and the pedal whereby said member reacts on the wall, the valve elements, and the pedal to reset these parts to their normal inactive positions. In another disclosed embodiment, a modified valve mechanism is provided wherein there are three principal cooperating elements, a pair of which is telescopically-related and slidably interfitted within the third element, and capable of relative and conjoint movements with respect to each other and to the third element. The inner slidable element of said pair of elements being operably disposed between said member acted on by said reactive and return spring and the pedal, and a releasable connection of novel character is provided between the pair of slidable elements enabling the outer of said pair of elements to have a "floating" action between the third and inner elements whereby thrust deflections induced by pedal actuation of the inner element bypass the outer element for longer service life with minimum wear between the two cooperating elements.

A further object of my invention is to provide novel control valve means incorporating pre-energized reactive and return spring means which provide instant opposition to initial pedal movement to oppose operation of said pedal from normally released position, said spring means being additionally energizable to progressively augment resistance to pedal movement substantially proportional to the operating movement of said movable wall in a thrust-producing direction.

A further object of the present invention is to produce in thrust-applying means of the type referred to, novel pedal control of fluid pressure operated means whereby pedal movement is not limited to the actuating movement of the control valve mechanism operatively associated therewith, thus to provide a range of additional or supplemental movements of the pedal to that required for valve actuation thereby, for controlling such thrust-applying operations in cooperation with, or independently of the fluid pressure means without actuating the elements of the valve mechanism beyond their full thrust-applying position of control.

In the interest of brevity, other objectives and salient features will be noted hereinafter in lieu of presenting them categorically in the above general statement of the nature of the invention. A more comprehensive understanding of the advantages of the invention and its mode of operation may be had from the detailed description thereof to follow with reference to the drawings which accompany this specification.

In the drawings:

Figure 1 is a longitudinal vertical section of my new and improved valve mechanism constructed in accordance with the present invention, and shown in operative association with a fluid pressure operated servomotor, wherein the parts are in their normally released disposition;

Figure 2 is a view similar to Figure 1 showing an operated disposition of the valve mechanism corresponding to an energized status of the associated servomotor;

Figure 3 is a fragmentary sectional view taken along the line 3—3 of Figure 2;

Figure 4 is a fragmentary longitudinal section illustrating a modified form of the invention;

Figure 5 is a fragmentary longitudinal section of another modified form of the invention;

Figure 6 is a transverse sectional view taken along the line 6—6 of Figure 5; and Figure 7 is a view similar to Figure 5, demonstrating an operatively adjusted disposition thereof.

Referring to the drawings:

The illustrative embodiments of my new and improved control valve mechanism are disclosed in connection with a pressure differential operated booster servomotor adapted to operate in part the hydraulic master cylinder in a brake system on automotive vehicles and the like, said servomotor being designated as a whole 28 and is operatively associated with a hydraulic master cylinder designated as a whole 42 and having a cylinder 68 fitted with a movable piston or wall 70 normally disposed in released position as shown in Figure 1. The cylinder is divided interiorly by said wall into a constant (atmospheric) pressure chamber 91 and a variable pressure (vacuum) power chamber 89. A pressure-transmitting member disclosed herein as a piston rod or plunger 72 is acted on by said wall to actuate the said master cylinder as is understood.

My new and improved control valve mechanism comprises: a valve housing 77 provided with complementary left and right, as viewed in the drawings, end sections 78 and 80 respectively. The two sections are rigidly clamped together as by cap screws 82, which screws also serve to mount the piston 70 on the housing 77 as shown. The front wall 84 of the left end section is provided centrally with a projecting hollow boss 86, and has formed therein one or more ports 88, whereby to establish communication between the vacuum-power chamber 89 of the cylinder 68 and the annular fluid chamber 90 in the valve housing 77, while the other chamber 91 in the cylinder 68 is maintained at atmospheric pressure via conduit 38.

The right or rear end of the piston rod 72 is axially bored as at 92, and is pressfitted into the boss 86 as shown. Numeral 94 designates a bearing sleeve pressfitted through a circular opening in the wall 84 into a counterbore of the axial bore 92. Slidably mounted in said sleeve is a plunger member 96, the left or forward end of which is provided with a plurality of integrally formed outwardly projecting radial lugs 98, three being preferable as illustrated in Figure 3. The axially bored end 92 of the piston rod is provided with three circularly spaced longitudinal slots 100 through each of which one of the radial lugs 98 normally projects in predeterminately spaced relation with respect to the forward end of said slots to form what may be termed a "lost-motion mechanical connection" for limiting relative operating movement between the member 96 and piston assembly 70, said rod being further provided with a radial exhaust port 102 adjacent the closed end of the axial bore which serves to prevent air compression during operational movements of the plunger, as will appear.

Numeral 104 indicates a substantially cup-shaped spring seat for one end of a normally preloaded reactive and return spring 106, which spring is preferably conical in configuration and is interposed about the piston rod 72 between the circular projecting flange 108 of said seat and the bottom wall 73 of cylinder 68. The bottom wall 110 of said spring seat has a projecting bearing sleeve segment 112 about the piston rod 72, said sleeve segment being surrounded by a flat circular segment 114 against which the radial lugs 98 are seated. Projecting forwardly from the front wall 84 of valve housing section 78 is a series of reinforcing ribs 116, integrally formed with said wall and with the boss 86. The final convolution of the conical return spring 106 at its smaller end, terminates in an inturned segment 118 which, extending through a circular opening provided therefor in the spring seat member, projects into the space obtaining between two of the adjacent reinforcing ribs 116 aforesaid to stabilize the spring in axial alignment with its seat. The forward face of the boss 86 is identified by the numeral 120. The aforesaid plunger 96, radially disposed lugs 98 projecting outwardly on said plunger and the movable spring seat member 104 form what may be termed "operating mechanism" for the reactive and return spring 106, said mechanism being juxtaposed in part with respect to said power-piston 70.

The right end section 80 of the valve housing has pressfitted therein a tubular member 122, the major portion of which extends into the chamber 90, and surrounds the free end of the plunger 96. Reciprocably mounted in the tubular member 122, with its left end contiguous to said free end of the plunger, is a generally cylindrical air control valve element or piston 124, which has a first external annular groove (fluid chamber or channel) 126 formed thereon, said groove being in constant communication with the source of vacuum (not shown) via an opening 128 in tubular member 122, a passage 130 in the valve housing section 80, a flexible connection 132, and conduit 18. The valve element 124 also has a second external annular groove (fluid chamber or channel) 134 formed thereon, said groove normally connecting the power chamber 89 to atmosphere via openings 136 in the valve element, a port 138 in the tubular member 122, annular chamber 90, and ports 88 aforesaid, atmospheric chamber 91 and conduit 38. An annular working land 135 separates the two grooves and is operative to selectively connect the port 138 to atmosphere and to the source of vacuum as clearly shown in Figures 1 and 2.

As best seen in Figure 1, movements of the valve element 124 to the right are limited by an abutment ring 140 maintained in position by a split retainer ring 142. This released or "off" position of the valve element 124 is effective to inactivate the servomotor 50, and when said valve element is moved out of engagement with the ring 140 its operating or "on" position of control is established to activate said motor. Numeral 144 designates a valve push rod having at one end a ball and socket connection 146 with the valve piston 124, and at its other end, a pivotal connection 148 with the pedal member 48. A flexible bellows 150 surrounds that portion of the valve rod which projects through the toe-board into the driver compartment, said bellows being suitably supported from the cover 152 which seals the upper end of power cylinder 68.

In the modified construction of the invention illustrated in Figure 4, a similar normally pre-tensioned spring 106a is employed to transmit "feel" of brake application to the operator, as will be explained. All elements which appear in this view, and which have been previously described, are identified by the same reference numerals distinguished, however, by the addition of the letter "a" to each. It is to be noted, however, that the lengths of the longitudinal slots 100a in the piston rod have been increased, and that the radial lugs 98a, which project outwardly through said slots, engage against a spring seat 156 slidable on said rod. Numeral 158 indicates a centralizing spring seat secured to the bottom wall 73a of cylinder 68a. Interposed about the piston rod to react between said two seats, is the spring 106a, as shown. An auxiliary compression spring 160 is provided in this modified structure to supplement the return action of the reactive spring 106a on the power-piston assembly 70a when operator force is removed from the pedal 48. This auxiliary spring is installed under a normally preloaded condition and is effective to continuously oppose movement of the power-piston assembly 70a to drive the plunger 72a into hydraulic chamber 54 whereby liquid in said chamber is pressurized. The movable spring seat 104 of the first embodiment is installed behind the radial pins 98a so that the latter cannot displace this seat member out of engagement with the power-piston assembly 70a. The auxiliary spring 160 is operably disposed to bear at one end on the end wall 73a of the power cylinder 68a and the other end reacts on the seat 104a, and since this latter spring is of larger diameter than the reactive spring 106a in the preferred construction, it therefore encircles the smaller spring and, as noted, both springs have their forward ends bearing on the end wall 73a with the end of spring 106a centralized between the larger spring on the plunger 72a by the seat member 158 bearing on said end wall, while the opposite corresponding ends of said springs 160, 106a react on the fixed seat member 104a carried by the power-piston assembly 70a and the seat member 156 movably disposed on the plunger 72a respectively.

In the modified construction of the invention illustrated in Figures 5 through 7, the air control valve element is tubular throughout, and the ball and socket connection 146b is disposed in a telescopically related piston-like actuatable member which is releasably interconnected by a ratcheting connection with said valve element, as will be explained. All structural elements which appear in these views, and which have been previously described, are identified by the same reference numerals distinguished, however, by the addition of the letter "b" to each.

The modified air control valve element or piston is designated 164, and is slidable in the tubular member 122b between the abutment ring 140b and a split stop ring 166 which is seated in an internal groove provided therefor in said tubular member as shown. The normal or brake-released position of the valve piston 164 is exhibited in Figure 5, wherein it is seen that the right end of said element abuts the ring 140b, whereas a projecting annular flange 168 thereof is disposed in spaced relation to the right of the stop ring 166.

The piston-like member earlier referred to is designated 170, and is also slidably disposed in the tubular member 122b. It includes a socket segment 172 disposed contiguous to the free end of the plunger 96b, and a sleeve segment 174 disposed within and coextensive with the valve element 164. As shown in the drawings, the valve rod 144b has a ball and socket connection 146b with segment 172, and rightward movement of the member 170 is limited by the stop ring 166. The sleeve segment 174 which is smaller in diameter than the valve element 164, has formed therein circular openings 176 and an annular external groove 178 in which, as particularly demonstrated in Figure 6, is seated an expansive yieldable split ring or collar 180. The periphery of the collar 180 has formed thereon a series of parallel and closely generated V-shaped serrations 182 which cooperate with a series of complementally shaped internal grooves 184 provided in the valve element 164, thus to releasably interconnect the member 170 and said valve element for limited movement together. First and second annular external grooves (fluid chambers or channels) 186 and 188, respectively, are formed in spaced relation by an annular land 189 on the valve element 164, the groove (fluid channel) 188 communicating with the hollow interior of said valve element via radial ports 190.

The first external groove (fluid channel) 186 is in fluid communication with the vacuum source (not shown) in the identical fashion described relative to the groove 126 of the Figure 1 embodiment of the valve element. The second external groove (fluid channel) 188 normally vents the servomotor vacuum chamber 89b to atmosphere via ports 88b, annular chamber 90b, port 138b, ports 190, ports 176, atmospheric chamber 91 and conduit 38 as illustrated in Figure 1.

It is noted that one of the features inherent in the Figures 5 through 7 construction, is that wear with respect to the air control valve element 164 is negligible, in that pedal forces are not applied thereto directly, as should be manifest but will be more fully explained hereinafter. Another feature is provided by the ratcheting conection 180, 182, 184 which functions to accommodate relative displacement of the actuatable member 170 with respect to the valve element 164 upon the latter being established in either open or closed position of control under influence of limited simultaneous movement with said member 170 provided by said ratcheting connection, and thereby, enabling operation of the valve element to such positions of control to be advanced with respect to the normal position from which the actuatable member is effective to control said valve element, said advancement being limited to the relative number of cooperating teeth on the collar 180 and the valve element respectively.

Operation

The main embodiment of the invention is exhibited in Figures 1 through 3, and the operation thereof will now be explained with reference also to Figure 1. The normal, that is the "off" condition of the valve mechanism is depicted in Figure 1, wherein the disposition of the pedal member 48 is fully retracted or released. The operative, that is the operating "on" position of the valve mechanism is depicted in Figure 2, wherein the disposition of the pedal member 48 corresponds to a depressed status thereof to effect relative adjustment of the parts as shown in Figure 2.

In the "off" status of the valve mechanism, the conical compression reactive and return spring 106 biases the piston 70 and consequently its associated rod 72 to the positions thereof portrayed in Figure 1. As a result, the annular element 76 tilts the stem 66 of valve assembly 64 whereby the hydraulic chamber of cylinder 54 is placed in fluid communication with reservoir 60. As a further result, plunger 96 maintains the air control valve piston 124 against the abutment ring 140 whereby to place the pedal 48 in actuatable status, and to simultaneously provide a non-communicative relationship between the power cylinder chamber 89 and the source of vacuum, such as, for example, the engine-intake manifold, as should be apparent from the preceding description augmented by an inspection of Figure 1.

The lost-motion connection 98, 100 which defines the relative operating movement of the valve element 124, with the brakes released as portrayed in Figure 1, is fully established between the radial pins 98 and forward ends of the longitudinal slots 100 in the plunger 72 with the opposite sides of the pins in engagement with the confronting circular end of the piston boss 86. The inner marginal surface of the sleeve segment 112 engages the confronting sides of the pins under influence of the reactive spring 106 whereby the pins are normally impinged between said sleeve segment and boss 86, best demonstrated in Figure 1, in readiness for pedal actuation to control a brake-applying operation of the hydraulic cylinder 54 assisted by the servomotor 50 as is understood. During relative movements of the spring seat 104 accommodated by the lost-motion connection aforesaid, the plunger and valve elements 96, 124 respectively are moved simultaneously therewith by the pedal 48 via interconnecting link 144 to dispose valve land 135 to the left of port 138 to open the latter (see Figure 2) thereby energizing the power piston assembly 70, the degree of energization being determined by the extent to which the port 138 is exposed to the annular vacuum channel 126. At full open position of the valve element 124, the radial pins 98 are brought into engagement with the forward ends of the slots 100 wherein the lost-motion therebetween is full taken up enabling pedal-actuation by the operator to be applied via said pins to operate the plunger 72 to apply and release the brakes supplementarily to power assistance provided by the servomotor 50, and in the event of complete power failure the brakes may be operated in the usual manner by the foot. It is important to observe here, that during pedal actuation of the valve element 124 to induce power assistance by the servomotor 50, the spring 106 does not oppose movement of the power-piston assembly 70 since the lost-motion connection aforesaid enables the spring seat 104 to move ahead of the movement of the piston 70 corresponding to any given valve open position until the lost-motion is taken up for direct foot operation of the hydraulic cylinder 54 as explained above. Accordingly, this novel arrangement of spring control in a brake-applying direction provides maximum utilization of the pressure differential acting across the piston 70 to assist in applying the brakes since the biasing effect of the return spring 106 is rendered inactive on the piston during power assistance operations thereof, but during release of the pedal 48, this novel spring arrangement becomes effective on the piston 70 via the pins 98 engaging the boss 86 to return the power assembly to released position portrayed in Figure 1 and at the same time provide the operator with a sense of the degree of release, and return the valve element 124 to its normally closed position, best illustrated in Figure 1 wherein the valve land 135 is disposed to the right of the port 138.

It should also be noted that the biasing action of spring 106 supports the weight of the pedal and its associated link 144 in the fully released position of said pedal, said spring preferably having been installed in the power cylinder in pre-stressed condition to provide instant resistance to initial pedal movement. In consequence of this arrangement, reaction or "driver feel" is always in evidence at the touch of the pedal, irrespective of the degree of pedal depression. Manifestly, whenever the pedal is incrementally depressed during a brake-applying operation, reactive evidence becomes increasingly pronounced inasmuch as the spring 106 becomes increasingly stressed, as the piston 70 advances leftward to apply the brakes. In other words, initial reaction is instantaneous (there being no lost-motion movement of the pedal as found in prior art arrangments); and further, the reaction is constantly and increasingly effective throughout the full operating stroke of the pedal. Thus, smooth braking control is provided throughout the range of pedal movements from the fully released to the fully depressed positions thereof.

It is also noted that the vacuum-power cylinder chambers 89, 91 are in communication with the atmosphere to balance pressures on both sides of the piston 70, via conduit 38, air control valve element 124 and the circular openings 136 therein, chamber 90, and ports 88.

Assuming now, that with the vehicle engine in operation, it is desired to apply the brakes, the pedal 48 will be actuated by the driver's foot in the ordinary manner. Initial depression of the pedal causes the air control valve element 124 to move leftward relatively to the piston 70 until the annular land 135 thereon comes into registry with the port 138. As a result, communication between atmosphere and the vacuum chamber 89 is interrupted momentarily, while at the same time, plunger 96, which obviously moves leftward also a corresponding distance, further compresses the spring 106 slightly without disturbing the stationary aspect of the piston 70 and its rod 72. This is so because the radial lugs 98 are free to move leftward in the slots 100 independently of the piston and rod, and are in engagement with the flat segment 114 of the cup-shaped spring seat 104. The radial port 102, as previously pointed out, prevents any pressure buildup in the axial bore 92 as the plunger progresses.

Assuming now that the pedal is further depressed slightly, the valve element 124 and the plunger 96 also advance therewith, whereby to uncover the port 138 and to additionally compress the spring 106. Simultaneously with the uncovering of the port 138 however, vacuum chamber 89 is placed in fluid communication with vacuum via ports 88, chamber 90, port 138, annular groove 126, passage 130, flexible connection 132, and vacuum conduit 18. As a result, the piston 70 and its rod 72 immediately move to the left because of the pressure differential effective across opposite sides of the piston 70 as is understood. Initial movement of the piston rod effects disengagement of its disc 76 from the depending stem 66 of the valve assembly 64, whereby said assembly automatically seals the opening 62 to prevent communication between the hydraulic chamber of cylinder 54 and reservoir 60. Beginning at this point in the operation of a brake application, and upon further depression of pedal 48, the piston 70, its rod 72, the valve element 124, and the valve rod 144 advance as a unit with said pedal, whereby to cause hydraulic pressure to be increasingly applied via angular passage 58, residual check valve 56 and piping 40 to the brake cylinders (not shown), in consequence of volumetric displacement of fluid under pressure from the hydraulic chamber aforesaid.

Manifestly, as the unit referred to advances incrementally to the brake-applied position thereof illustrated in Figure 2, the inherent and thus further compressed expansive force of the return spring 106 transmits to the driver's foot successive reactions corresponding in intensity to the distance the pedal 48 has moved in such brake-applying direction.

Thus it should be evident that my invention provides novel and improved pedally-controlled power brake mechanism, wherein initial depression of the pedal 48 actuates the valve piston 124 to first isolate the vacuum chamber 89 from atmosphere, to thereupon evacuate said chamber and concurrently seal off fluid communication between the chamber of hydraulic cylinder 54 and reservoir 60 as the piston 70 and its rod 72 are caused to advance in consequence of atmospheric pressure in chamber 91 acting across the piston 70, and to thereafter by a combination of evacuation, atmospheric pressure, and pedal depression, to increase or decrease the hydraulic pressure of brake application as desired or required.

At the same time it should be apparent that the invention provides for the operator by way of the spring 106, an ever-present and automatically discernible "feel of the brake situation," irrespective of the extent of pedal depression.

The operational behavior of the reactive and return spring 106 referred to above is unique in that it produces control characteristics in the way of reaction against which the control valve piston 124 is adjusted to control operative energization of the vacuum-motor 50. This reaction increases above normally preloaded status of this spring in direct proportion to the distance the pedal 48 is depressed, and therefore, such spring resistance alone would not necessarily have a magnitude correlated with the amount of thrust or braking force in effect at every position of the pedal, and too, pedal-load would increase toward the end of the full operating stroke of the plunger 72 actuated by the vacuum-motor to an undesirable degree which would defeat the objective of reduced pedal effort.

As this spring is additionally compressed above its normally preloaded status, it provides increasing resistance in relation to pedal movement up to the point the plunger encounters substantial resistance, and thereafter, resistance becomes substantially constant on the pedal 48 as a consequence of the substantially stationary condition of the thrust-inducing parts acting on the load or non-compressible column of brake fluid in the present application of the invention as is understood. Since the fluid becomes pressurized at different stations along the full operating stroke of the motor-actuated thrust-member or plunger 72 due to wear on the brake linings and parts, and to leakage of the various seals in the hydraulic braking system, it will be appreciated that if the pressurized state of the fluid to apply the brakes becomes effective toward the end of the full operating stroke of the plunger 72, that the reaction from the spring 106 can become severe resulting in a moderately "hard-pedal" due to rapid buildup in the force of this spring from its normally preloaded status, the latter providing the operator with accurate sensing to initially apply the brakes thus preventing sudden braking applications which would possibly result in a power-surge if the operator lacks this awareness as he applies the brakes.

Reduction of this spring reaction principle to commercial usage, has demonstrated that the preloaded weight in braking opplications should be set at approximately 20# and rated to react at 60# at the end of the full operating stroke of the plunger 72, which force when transmitted through the pedal leverage ratio reacts on the operator's foot at 5 to 15# through the full operating stroke of the plunger where a normal height pedal is employed; but if the pedal ratio is lowered to accommodate use of a "low-pedal" with less mechanical advantage, reaction from this spring increases progressively to a limited extent that converts the low-pedal into a moderately "hard-pedal" as aforesaid through the stage of operating the control valve piston 124 from normal "off" position to operating "on" position to control operation of the vacuum-motor 50. Accordingly, this spring serves to best advantage as a reaction means by utilizing its yielding resistance through substantially the first-half of the series of working or pressurizing movements along the full operating stroke of the plunger which may be had by keeping the brakes properly adjusted and the system free of leaks which service operations contribute to safer driving. If a lower rated spring is utilized then reaction of sufficient magnitude at points beyond the half-way mark of the plunger stroke in a pressure working direction does not provide the operator with the necessary physical perception of the work or braking force in effect.

With attention directed to Figure 2, it is noted that the invention provides safeguard means in the event of partial or entire power failure. It will be remembered that the disposition of the mechanism exhibited in Figure 3 presents the normal brakes-fully-applied status, wherein the vehicle is at a standstill, or should be as is understood. However, should it perchange happen that the vacuum-power force per se would fail to arrest forward travel of the vehicle completely, a slight additional pedal depression is provided for, in that in consequence thereof, the radial lugs 98 may be brought to bear against the end walls of slots 100, whereby the piston 70 and its rod 72 can be advanced directly and solely by driver foot application, resulting in increased hydraulic pressure delivered to the brake cylinders.

From the foregoing, it should be clearly apparent that this invention is admirably suited for incorporation in booster motors particularly suited to control brake systems on trucks, busses, and like vehicles. It should likewise be apparent how intermittent full brake application and partial release operations may be attained and instinctively controlled effortlessly by pedal actuation on the part of the operator. It should further be apparent that the mechanism enables the operator to normally apply a "brake-holding" status to the system at any point within the range of pedal movements which may be had between the Figure 2 disposition of said mechanism, and the disposition thereof which obtains when the annular land 135 of control valve 124 is in registry with the port 138 responsive to halting the pedal.

It is of course to be understood that when said land is in registry with port 138 the latter is covered, inasmuch as the diameter of said port is of smaller extent than the width of land 135. Thus it should be evident that whenever pedal depression ceases at any point in a brake-applying operation, registration of said port and land automatically follows, in consequence of which action the brakes are held "on" by the then existing substantially counterbalancing forces acting on opposite sides of the piston 70.

The Figure 4 embodiment of the invention operates in substantially the same manner as the main embodiment. In this construction, however, the spring 160 functions only in the usual and conventional sense of returning the piston 70 to brake-released position in response to a closing of the air control valve. That is to say, said spring 160 is a conventional conical compression spring which had been initially installed in cylinder 68 in a compressed condition. Consequently, this spring does not transmit any "brake feel" whatever in accordance with the concepts of my invention, as should now be understood.

In the Figure 4 construction, the pre-tensioned conical spring 106a, interposed about the piston rod 72 between the stationary spring seat 158 and the slidably mounted spring seat 156 is the element which cooperates with spring 160 to return the vacuum-actuated piston 70 to normally released position as illustrated in Figure 1 and also serves to transmit to the pedal 48, the "feel" of brake application substantially proportional to the stroke of piston 70a in applying the brakes. The said reactive spring 106a, movable in response to movements of plunger 96a and its radial lugs 98a, relative to the piston 70a, is initially installed in the cylinder in a pre-compressed condition according to the degree of initial reactive force desired on the pedal 48, so that it operates in the same manner as that described with respect to the reactive spring 106 of the main embodiment. In other words, since spring 106a is independent of the return spring 160 and is pre-tensioned, its action is not affected by the concurrent forces exerted by said return spring so that selective reactive springs 106a may be utilized to gain the desired reaction without modifying the return spring 160. As previously noted, the longitudinal slots 100a are of greater length than those of the main embodiment, whereby to accommodate a slightly increased advance of the radial lugs 98a in additionally energizing the spring 106a in response to pedal depression.

It is noted with respect to the Figure 4 modification, that the pre-tensioned spring 106a and cooperating slidable spring seat 156 arrangement are suitable also for effective operation in conjunction with the described air control valve construction portrayed in Figures 5 through 7.

In the said Figures 5 through 7 embodiment of this invention, the aforementioned novel air control valve element 164 exhibits a yieldably releasable ratchet connection between it and the piston-like actuatable member 170, the latter having a ball and socket connection with the pedally movable valve rod 144b. The releasable connection referred to comprises the split expansible ring 180 seated in an external annular groove 178 provided therefor in said valve element, and having minute V-shaped peripheral serrations 182 as previously described. These serrations or grooves are closely generated in parallel circular relationship, and engage in the corresponding internal grooves 184 of the valve element 164. It is noted as illustrated in Figure 5, that a series of normally non-engaged internal grooves 184 is provided to the left of the ring 180, whereby to accommodate a slightly additional movement of the piston member 170 and the valve rod 144b relative to the valve element 164 after the pedal 48 has been depressed sufficiently to bring the annular flange 168 of said valve element into engagement with the stop ring 166. In the case where the actuatable member 170 has been relatively displaced with respect to the open position of the valve element 164 in the manner just described in response to pedal depression, release of the pedal would be immediately effective through the ratchet connection to establish the valve element in closed position in unison with pedal movement, whereupon the pedal is released from the valve element in its existent closed position, to have relative displacement with respect thereto back to its normally released position in readiness for another depressing movement therefrom to open the valve element in unison therewith. Accordingly, it is seen that the ratchet connection accommodates relative displacement of the pedal and connected actuatable member 170 in a depressing or releasing direction of movement after first establishing the valve element 164 in its selected position of control in unison with such pedal movement.

An exemplification of a relative disposition of the mechanism corresponding to that just described is exhibited in Figure 7. There it is seen that the air control valve element 164 has been advanced from the Figure 5 disposition thereof, by pedal depression to a position wherein the annular flange 168 abuts the stop ring 166. Up to that point, said valve element and the piston member 170 has moved in unison because of the releasable connection described, and the compression spring 106b had been further compressed whereby to transmit "brake application feel" to the driver via plunger 96b, piston member 170, ball and socket connection 146b, valve rod 144b, and pedal 48. With left movement of the valve element arrested, additional pedal depression causes the resilient expansible ring 180 to contract and thus ratchet over the internal serrations 184, whereby the piston member 170 advances independently of the valve element while retraction of the piston member responsive to pedal release, effects simultaneous movement of the valve element to closed position followed by restoration of the relative positions of the member 170 and valve element as exhibited in Figure 5 wherein pedal 48 is in normal fully released position. In consequence of this arrangement, it should be manifest that brake application directly from the pedal may also be had via the plunger element 96b, its radial lugs 98b, and the longitudinal slots 100b while the valve element 164 is actuatable in unison with the pedal to open and closed positions at any point along full pedal stroke to enable "on" and "off" operations of the brakes despite relative operation aforesaid of the pedal with respect to the valve element is accommodated following such opening and closure thereof.

Although the illustrated and described releasable connection is preferable, it is noted that a split and therefore resiliently expansible ring having a smooth peripheral surface may be substituted for the serrated ring 180, and that a non-serrated internal bore may be provided in the valve element 164. In such an arrangement, the frictional coefficient obtaining between the expansible ring and the smooth bore of the valve element would provide the connection between said element and the piston member 170.

Operational summary

From the foregoing description, taken in conjunction with the various illustrations of the different embodiments of my invention, it will be seen that certain interrelated components of the valve mechanism possess similar functional characteristics such that interchangeability is readily effected, particularly in connection with the reactive spring controlling features and type of pressure-transmitting member 72 employed in the hydraulic cylinder 54, the latter may take the form of a piston having the same cross-sectional area as the pressure chamber, or a plunger of less cross-sectional area than the chamber 54 which, in the latter case, would eliminate machining the interior of the pressure cylinder with a longer working stroke required of the plunger. For example, the movable wall 70 may be either a piston or a flexible diaphragm connected to the pressure-transmitting member 72 with the adjacent end slotted at 100 with open ends and fitted with the bushing 94. This arrangement facilitates assembly of the cylindrical element 96 with the radial pins 98 installed integrally thereon or detachable. Where the pins 98 are inserted after the cylindrical element 96 has been placed in the position of Figure 1, then the bushing 94 could be dispensed with, and the slots 100 formed in the wall of the plunger 72 with closed ends, and while the cylindrical element 96 has been illustrated separate from the valve element 124 to avoid the need for accurate axial alignment therebetween, these two elements may be formed integrally as the disclosure clearly depicts.

Further considering the novel advantages provided by the reactive and return spring means 104, 106, this novel spring control enables rating of this spring to whatever degree of reaction desired since its action never interferes with the movement of the power assembly 70. This spring is continuously effective on the brake pedal 48 via the spring seat 104, radial pins 98, cylindrical element 96, valve element 124 and link 144 so that immediate yieldable resistance to movement of the pedal is encountered by the operator with the inauguration of a brake applying depression of the pedal. In this manner, the operator senses the degree of braking force being applied from the instant pressure is applied on the pedal as the spring 106 progressively builds up in reactive force substantially proportional to the operating movement of the power-actuated plunger 72. Since the spring seat 104 must move ahead of the piston boss 86 for control valve actuation to induce the power piston 70 to be energized, the force exerted by spring 106 is rendered non-effective against the piston thus providing maximum effectiveness of the power phase with a resultant higher point at which "power-run-out" would become effective than would otherwise occur, the latter condition representing maximum power application of the brakes and should an even greater braking force be required for the given stopping or slowing operation of the vehicle, then the operator must apply such additional pressure to the pedal 48 via the pins 98 engaging the ends of the slots 100 to bring the total brake applying force to the degree required.

It is also important to note that the auxiliary spring 160 of Figure 4 may be incorporated in either of the embodiments Figures 1–3 or Figures 5–7 where a continuous biasing action is desired on the power-piston assembly 70, 70b to supplement the reaction of the reactive springs 106 or 106b respectively during release of the brakes as is understood. This arrangement would find a practical application in installations of the present invention on heavy-duty vehicles and the like.

An important feature of braking control results from the use of a normally pre-energized spring, such as spring 106 or 106a reacting on the pedal 48 to provide instant resistance to movement of the pedal, such that in the event the brakes are applied initially by a sudden thrust of the pedal, this spring gives the operator an awareness of pressure being applied so that the power-boost application may be brought in to assist the pedal operation without abrupt shock and grabbing. This smooth mergence of the power phase with the pedal operation after the latter has inaugurated pressure build-up in the spring, avoids the possibility of power-boost lock of the vehicle wheels with resultant tendency of throwing the car occupants forwardly out of their seats, and sometimes leads to personal injury, loss of control or a potentially dangerous skid. Thus, the present invention inherently provides full control, predictable response for complete braking safety without requiring special manipulation of the control pedal.

The present servomotor booster 50 is especially adapted for the replacement market since any conventional master cylinder assembly mounted in the engine compartment on the vehicle firewall and which utilize for its operation a pivotally suspended pedal, may be used intact thereby appreciably lowering the cost to the car owner and greatly simplifying the installation where the unit is applied on after market cars. This noteworthy feature is provided by the use of the novel reactive spring means 104, 106 incorporated in the servomotor itself. Thus, the present liquid pressure producing device actually comprises two separate units; namely, the servomotor operably combined with the factory-installed hydraulic master cylinder adapted for conventional foot operation as is understood. This novel application of servomotor boost to a conventional master cylinder retains all of the brake control features provided by the latter with substantial reduction in operator effort. Where the present invention is merchandised as an accessory or after-market installation, only the servomotor is required since the master cylinder, pedal and linkage assembly, and dust boot factory installed on the car are utilized without alteration at a great savings to the car owner to provide power assistance in operating the brakes with no more after-installation maintenance being required than normally expected with a conventional foot-operated system.

As the present disclosure clearly demonstrates, the servomotor 50 is the self-contained type in that it includes the reactive means on the operator control. This novel construction not only facilitates its installation in a motor vehicle, for example, but also utilizes the standard master cylinder without disassembly thereof to form a unitary power-assisted braking control where incorporated in a hydraulic system. In the case of mechanical brakes, then the servo motor actuated member 72 would be mechanically linked to the brake actuating cam with the reactive means 104, 106 serving to give the operator an awareness of the degree of braking force being applied by the servomotor for smooth braking applications.

Accordingly, the present invention provides a yieldable force, such as the illustrated springs 106 or 106a, to constantly oppose the operator during operation of the vehicle brake system. This opposing force progressively builds up against the operator from a normally preloaded status, in substantially proportional relationship to the effective operating stroke of the movable wall 70. This is true, since the reactive force exerted by the spring increases as the pressure-transmitting member 72 is driven farther into the hydraulic chamber 54, thus giving the operator a "feel" or reaction from the instant he moves the pedal 48 to enable him to smoothly bring in the power phase with followup control to provide the degree of power-assistance desired until full power has been utilized if required.

The control valve 124 or 164 has the usual follow-up action, each of said valves being characterized by relative sliding movement with respect to its cooperating sleeve movable in unison with the power-piston assembly 70. As the power piston moves on its pressure stroke, it tends to overtake, and "lap" the control valve element, unless brake-applying movement of the pedal 48 continues. Whenever, the operator removes his force from the pedal, the control valve follows pedal movement relative to the power-piston assembly 70 into the position shown in Figure 1 wherein the power chamber 89 communicates with the atmosphere, by reason of the force exerted by the reactive spring 106 on the valve member 124, said spring also simultaneously acts on the power-piston 70, with the valve member aforesaid in the position noted, to return it to released position depicted in Figure 1.

If the operator desires to add physical force after the full force (power-run-out) of the servomotor 50 has been developed, or, if there is power failure, direct physical force on the plunger 72 can be exerted via the valve element 124, plunger 96, radial pins 98 engaging the forward ends of the slots 100.

From the foregoing description augmented by an inspection of the drawings, it should be manifest that my invention provides novel valve mechanism adapted to achieve its objectives in a highly efficient manner.

Although I have illustrated and described preferred embodiments of my invention, I do not wish to limit such to the exact construction or arrangement of parts shown, since it is evident that modifications and substitutions may be made therein without departing from the proper scope or fair meaning of the subjoined claims.

Having thus described my invention I claim:

1. In a control valve for use in cooperation with a power member movable under influence of a pressure differential, the improvement which comprises: a housing having a cylindrical wall encircling a longitudinal bore; a piston-type valve element slidable in said longitudinal bore from a normal position; a first port through said wall communicating with said longitudinal bore; two longitudinally spaced annular lands on the valve element defining a pair of annular fluid chambers, one of said chambers continuously communicating with the first port; an atmospheric passage leading to said other chamber; a second port through said wall controlled by one of said annular lands to selectively connect said fluid chambers to said fluid passage and said second port, and to said latter port alone, respectively; a stop element incorporated between said wall and one end of said valve element to establish the normal position of the latter; a stationary member; a slidable member having a normal position; an element interconnecting said valve element with said slidable member for conjoint movement; and a normally preloaded spring reacting between said stationary member and the slidable member to bias the latter member and said valve element to their respective normal positions aforesaid wherein said second port is in communication with said fluid passage.

2. In a control valve for use in cooperation with a power member movable under influence of a pressure differential, the improvement which comprises: a housing having a cylindrical wall defining a longitudinal bore; a tubular valve element slidable in said bore from a normal position; a first port through said wall communicating with said bore; two longitudinally spaced annular lands on the valve element defining with said bore a pair of annular fluid chambers, one of said chambers continuously communicating with the first port; an axial bore through the valve element; a port through that portion of the valve element in circular alignment with said other chamber continuously communicating with said axial bore; a second port through said wall controlled by one of said annular lands to selectively connect the two chambers aforesaid to said second port; a fluid passage leading from said other chamber to atmosphere; an actuatable member telescopically-related to said valve element to have sliding movement in said axial bore from normal position; an annular external flange defining one end of the actuatable member and normally engaging the confronting end of said valve element; a series of closely generated circular toothed elements disposed in parallel relation in a portion of the cylindrical surface of said axial bore adjacent the other end of said valve element; an annular external groove in the outer cylindrical surface of the actuatable member normally in circular alignment with the circular teeth aforesaid; a split expansible ring engaging said external groove and having its external surface defined by complemental toothed elements cooperating with the toothed elements on the valve element to effect limited unison movement of the actuatable member and the valve element to its two operating positions of control, said cooperating teeth on the expansible ring and the valve element respectively being characterized by providing limited relative ratcheting engagement upon termination of the aforesaid limited unison movement to establish the valve element in its operating positions of control whereby such positions of control are establishable at different operating positions other than normal position of said actuatable member within the limits of said relative ratcheting engagement thereof with said valve element; a split stop ring engaging an internal annular groove in said wall adjacent one end thereof to limit relative operating movement of said valve element to establish one of its operating positions; another split stop ring engaging another annular internal groove in said wall adjacent the other end thereof, and engageable by the other ends of said valve element and actuatable member respectively to establish their respective normal operating positions wherein the flange on the actuatable member is engaged by the confronting end of the valve element; a stationary member; a slidable member having a normal position; an element interconnecting said slidable member with the valve element for conjoint movement; and a normally preloaded spring reacting between said stationary member and the slidable member to bias the latter member, said actuatable member and the valve element to their respective normal positions wherein said other chamber is in communication with said second port.

3. In control valve mechanism for use in cooperation with a fluid pressure actuated servomotor having a fluid chamber enclosure and a movable wall dividing said chamber into opposing fluid pressure chambers, and a source of pressure different from atmosphere communicable with one of said pressure chambers, the improvement which comprises: a fixed member; a pair of interfitting valve elements cooperable in normal disposition to balance pressures in said chambers, and relatively displaceable to operating disposition to establish differential pressures in said chambers; spring means including a normally preloaded spring reacting between said fixed member and one of said valve elements to establish them in their normal disposition; and an operator-operated member having a normally released position, and adapted to act on said one valve element to effect said relative displacement of said valve elements in opposition to said spring means, said means being characterized by progressively augmented reaction on said operator member in accordance with the operating movement thereof from normal position.

4. In control valve mechanism for use in cooperation with a fluid pressure actuated servomotor having a fluid chamber enclosure and a movable wall dividing said chamber into opposing fluid pressure chambers, and a source of pressure different from atmosphere communicable with one of said pressure chambers, the improvement which comprises: a fixed member; a pair of interfitting valve elements cooperable in normal disposition to balance pressures in said chambers, and relatively displaceable to operating position to establish differential pressures in said chambers; an actuatable member cooperating with one of said pair of valve elements; an operator-operated member having a normally released position, and adapted to actuate said actuatable member; means releasably interconnecting said actuatable member and said one valve element for movement together to effect said relative displacement of said valve elements, said means being operative upon full relative displacement of said valve elements to release said actuatable member from said one valve element without disturbing its then existent relatively displaced disposition thereof in response to increased operator force on said operator member in a valve displacing direction thereby accommodating relative movement of said operator member with respect to said valve elements, and to restore said valve elements to their normal disposition at substantially the operated position of the operator member upon release of the latter member therefrom; and spring means including a normally preloaded spring reacting between said fixed member and said actuatable member to establish said valve elements, said actuatable and operator members in their normal disposition, said spring means being characterized by progressively augmented reaction on said operator member in accordance with the operating movement thereof from normal position.

References Cited in the file of this patent

UNITED STATES PATENTS

| | | |
|---|---|---|
| 2,331,328 | Schnell | Oct. 5, 1943 |
| 2,544,042 | Pontius | Mar. 6, 1951 |
| 2,603,066 | Rockwell | July 15, 1952 |
| 2,642,165 | Banker | June 16, 1953 |
| 2,690,740 | Hupp | Oct. 5, 1954 |
| 2,763,989 | Ayers | Sept. 25, 1956 |
| 2,790,306 | Ingres | Apr. 30, 1957 |
| 2,802,455 | Ingres | Aug. 13, 1957 |
| 2,826,042 | Rike | Mar. 11, 1958 |
| 2,834,184 | Ingres | May 13, 1958 |
| 2,903,855 | Randol | Sept. 15, 1959 |